March 15, 1960 C. G. HARREL ET AL 2,928,739
FEED COMPOSITION AND METHOD OF MAKING AND TESTING
Filed June 30, 1958
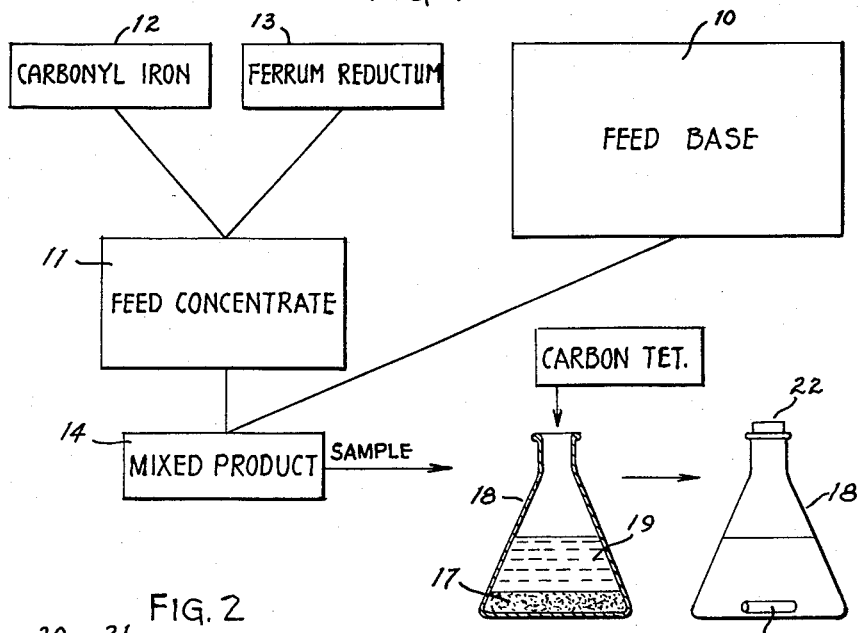
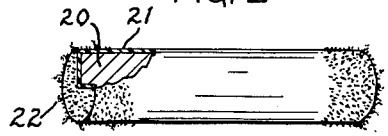
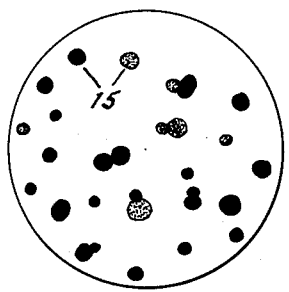
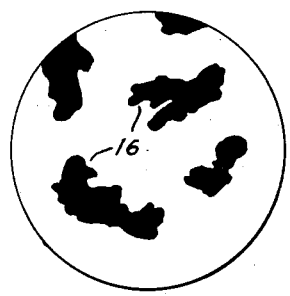
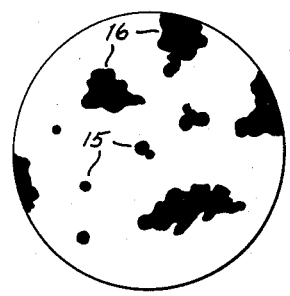

United States Patent Office 2,928,739
Patented Mar. 15, 1960

2,928,739

FEED COMPOSITION AND METHOD OF MAKING AND TESTING

Chastain G. Harrel and William A. Bosin, Minneapolis, Minn., assignors to The Pillsbury Company, a corporation of Delaware Application June 30, 1958, Serial No. 745,752

11 Claims. (Cl. 99—2)

This invention relates to feeds and feed concentrates utilizing a nutrient ingredient as a tracer for testing purposes.

It is an important object of the invention to provide feed materials with an edible iron nutrient compound so selected as to be capable of substantially total magnetic extraction.

Iron is known to be essential to animal growth and development and is often lacking in ordinary feed materials. Such lack may be compensated by supplying small but necessary amounts in basic feed products, or more commonly, in feed supplements or concentrates which are mixed in recommended quantity with the basic feed to fortify the same and to improve the nutritional value thereof. The concentrate ingredients may, even in concentrated form, constitute but a small percentage of the whole. When admixed with base feed, the percentage becomes even smaller. Thus, the iron component is in such small proportion as not to be visible to the naked eye when mixed in feed products.

Iron may be supplied in several forms, all of which can be assimilated by the animal's digestive system. These forms include organic compounds such as iron phytate, inorganic compounds such as ferric oxide, and elemental iron itself. If the particle size of the water insoluble forms of iron is small enough, the digestive process can utilize the material and change it to a soluble form. Thus colloidal iron itself becomes a good nutrient and is known to the art as such. The instant invention is concerned only with iron itself and with the addition thereof to feed materials in such physical form as will render it capable of easy and total extraction by virtue of its magnetic properties.

It is another object of the invention to provide a process for making feed concentrates and feed mixtures in dry pulverulent form which will employ dispersed nutrient iron in magnetically separable form, random sampling of said concentrates and mixtures yielding a portion of the iron which is indicative of the thoroughness with which proportionate mixing of feed components was accomplished in their preparation for commercial use.

In the preparation of concentrates, it is desirable to have a check on the proportions of the ingredients for manufacturing control. Where definite quantities of ingredients are mixed together in commercial batches, there is little opportunity for error in formulation itself. There is much greater opportunity for error, however, in failing to obtain uniformity of the proportions throughout every increment of the batch so that any one portion of the whole will yield the same analysis as the formula. This is particularly true as regards small ingredients which are already present in only minor amounts. Further compounding the difficulty is the mixing procedure, not controlled by the manufacturer, where the concentrate is added and intermixed with a base feed for division into smaller amounts which, in turn, is sold for direct consumption by animals and poultry. If the mixing is not thorough, some purchasers may receive an over-abundance of concentrate while others may be deprived of their fair share. Chemical analysis to determine the quantitative presence of the ingredients is obviously slow and expensive and mere visual inspection fails to indicate such deficiencies as may exist. However, if the concentrate ingredients were thoroughly intermixed in their correct proportion in the final instance, it follows that the correct proportion amount of any one of the concentrate ingredients in the mixed feed product proves a correct mixture in a sample thereof. If several random samples show uniformity, then the intermixing has been thorough and fair. The present invention is directed toward utilizing the iron component in the feed concentrate and feed product as the measure of the thoroughness of intermixing, the iron being completely extracted from a given weight of feed material and directly weighed to determine whether the theoretical amount of iron is actually present in the sample. In making such test in accordance with the invention, allowance is made for any magnetically separable iron particles already present in the base feed.

It is a further object of the invention to provide a method of testing which, within the bounds of experimental error, will quickly and efficiently extract substantially all of the nutrient iron fraction in a random sample of feed. By comparing with known feeds and concentrates containing preselected amounts of nutrient iron in magnetically separable form, such testing method will serve to detect the thoroughness of mixing of the feed material and may be used to identify the type and source of feed or feed concentrate by microscopic examination of the configuration of the preselected iron particles and the relative proportions thereof.

Unless the iron is present in completely separable condition, the test results would have little probative value. For this reason, the iron selected in accordance with the invention is of pure form and so isolated from extraneous forces, such as electrical and adherent effects, that simple and direct magnetic collection will accomplish the desired results. The iron particles are of such individual magnetically attractive character as to be drawn to a magnet when brought closely thereto. The entire sample is suspended in a non-viscous fluid which permits the migration and collection of the particles upon the magnet substantially without entrapping extraneous particles of feed or other of the concentrate ingredients.

Since the iron particles are microscopic but substantially discrete, the configuration thereof can be readily observed under a microscope. Iron particles may be characterized as to their configuration in accordance with certain processes by which they were made. Thus, even where the small quantity of iron additive has been selected for its magnetic attractability, its nutrient value, and its particle size, it may be further selected for its microscopic configuration. Otherwise identical mixed feeds containing the magnetically separable iron can be coded as to the kind and source of either or both the concentrate and the ultimate mixed feed.

The invention will be more fully set forth in the accompanying figures, in which:

Figure 1 is a schematic representation of the steps in the process of making the concentrate and mixed feed material and the method of testing;

Figure 2 is a perspective view of the magnetic element utilized for test purposes, a poriton of the element being cut away in vertical section to show the construction thereof;

Figure 3 is a magnified view of sized carbonyl iron particles employed as tracer material;

Figure 4 is a similar magnified view of sized iron particles of the ferrum reductum type; and Figure 5 is a magnified view of iron recovered from a random test sample showing the approximate relative distribution between the carbonyl iron and the ferrum reductum.

With continued reference to the drawing, and particularly to Figure 1, the general mixing procedure is outlined. The feed base is indicated by box 10 and may comprise any general ground product such as ordinary mash which is improved by the addition of a feed fortifier or concentrate 11. In the usual course of events, the iron component designated as 12, 13, or both, will be intermixed with the feed concentrate 11 which usually contains other minerals and vitamins as well as cereals. The concentrate is then added to the feed base in recommended proportions and thoroughly intermixed to produce the mixed product 14. As pointed out, the small quantities of at least some of the concentrate materials make it mandatory that they be properly mixed throughout the entire mass of the feed base. If it is desired to use the iron component as a tracer to determine the thoroughness with which the concentrate has been mixed, then it is incorporated therewith at the time the concentrate is compounded. If it is merely desired to determine the dispersion of the components in the ultimate mixed product, then the iron may be added to the concentrate and the feed base at the time they are first brought together. In either case, random sampling at several locations in the mixed product which demonstrates uniformity as to the amount of iron present is proof of thorough intermixing of all the components.

In order to effect magnetic separation of the iron for test purposes, a magnetically attractable form is used. It has been found that either the form known as carbonyl iron or that known as ferrum reductum serves admirably for the purposes herein disclosed. For coding purposes, mixtures of both may be employed. Referring to Figure 3, the configuration of carbonyl iron is shown as it appears under the microscope. The iron particles are spherical and easily distinguishable as such when examined under magnification. Referring to Figure 4, the configuration of ferrum reductum appears. The latter is characterized by nondescript or random configuration which seldom includes anything which can even be mistaken for a spherical shape. The individual particles 15 of the carbonyl iron and the individual particles 16 of the ferrum reductum are useful for the purposes herein disclosed when lying within the size range of average diameters including three to twenty microns. Iron particles within the range of diameters noted are not only easily digestible by animals but also are capable of magnetic separation as will be subsequently disclosed.

Referring again to Figure 1, a series of random samples are taken from the mixed product to determine the uniformity of mix at various locations therein. Where it is desired to test the uniformity of mix in the feed concentrate, the same procedure may be employed. For test purposes, 100 gram samples indicated at 17 are placed in a flask 18 and 175 milliliters of fluid, indicated at 19, are placed in the flask 18 to freely suspend the individual particles. Any non-corrosive fluid which will not thicken or react with the mixed product may be utilized for this purpose. Carbon tetrachloride is found to be satisfactory and, because of its solvent quality, insures against oils and other sticky substances becoming adhered to the iron particles.

Into the suspended product is placed a prepared magnet 20 which must be capable of maintaining uniform weight and easily cleaned between usages. To this end, it has been found that a thin coating 21 of plastic material such as Teflon is useful and will not interfere with the magnetic properties of the magnet 20. An enlarged view of the magnet is shown in Figure 2. In preparing the magnet, it is first rinsed with carbon tetrachloride, then dried at 100° centigrade for ten minutes. The magnet is weighted on an analytical balance and then placed in the flask 18 as previously noted. A stopper 22 is then applied to the flask and it is swirled in inverted position for at least thirty seconds. The flask is then righted and swirled again for another thirty second interval. This procedure is repeated for several times to effect intimate contact between the magnet 20 and all of the particles of the mixed product 17. The mixture is then poured from the flask 18. The plastic coated magnet and its adhering iron is then washed with carbon tetrachloride to remove adhered mash and fat particles. The magnet and its adhered iron particles are then laid on a watchglass and dried in an oven at 100° centigrade for ten minutes. The magnet and iron particles are then lightly brushed with a camel's hair brush to remove any dried feed particles which may have become entrapped by the magnetically clinging iron particles 22 which cluster on the magnet, as shown in Figure 2. The magnet and its adhering iron are then weighed and the difference in weight between the latter and the magnet taken alone gives the weight of iron removed from the sample. When it is desired to make another test, the iron particles 22 are wiped from the magnet 20 and the procedure is repeated. Since the feed base 10 may itself have small traces of magnetically attractable iron, a blank sample is taken at several locations prior to admixing the concentrate and iron component. An average may be made of the blank runs and the trace of iron found therein is then deducted from the amount of total iron collected by the magnet 20.

A typical series of tests is set forth in Table I below, the mixing having been effected in normal manner. The mixed product constitutes a 40% feed concentrate and a 60% corn meal feed base.

*Table I*

| Sample | Parts Per Million of Iron in Sample | Weight of Mixed Product Used, g. | Weight of Iron Added | Weight of Iron Recovered | Iron Recovered-Iron Added | Percent Iron Recovery |
|---|---|---|---|---|---|---|
| 1 | Blank | 100 | None | 0.0014 | 0.0014 | |
| 2 | 50 | 100 | 0.0062 | 0.0076 | 0.0014 | 100.0 |
| 3 | 100 | 100 | 0.0110 | 0.0133 | 0.0023 | 108.2 |
| 4 | 200 | 100 | 0.0206 | 0.0215 | 0.0009 | 97.6 |
| 5 | 200 | 100 | 0.0222 | 0.0228 | 0.0006 | 96.4 |
| 6 | 300 | 100 | 0.0294 | 0.0317 | 0.0023 | 103.1 |

The average blank showed 0.0014 gram of original magnetically separable iron present in the product before adding the nutrient iron component. The iron which was added consisted of 10% carbonyl iron having an average particle size of 6 microns in diameter and 90% ferrum reductum iron particles having an average particle size of 12.5 microns. The table shows a representative sample from each of a series of mixed products having various concentration levels of iron as indicated. The percentage of iron recovered in each case indicated that the mixing was satisfactory and that the mixed product could be classified as uniform in character.

Since the mixture of carbonyl iron and ferrum reductum iron will be proportionately distributed upon the magnet, a small portion thereof, when examined under a microscope will show approximately the same proportion between the different configurations of iron. The particular mixture of iron utilized herein (namely, 10% carbonyl iron and 90% ferrum reductum) characteristically appears under the microscope as illustrated in Figure 5. Casual inspection of the relative masses of the two forms suggests an approximate ten to ninety ratio between the carbonyl and ferrum reductum forms. It, therefore, becomes easy to estimate the particular mixture of irons used if the relative proportions are maintained at fairly wide intervals. For example, ratios between carbonyl and ferrum reductum irons in the order of ten to ninety; thirty-five to sixty-five; sixty-five to thirty-five; and ninety to ten.

It may thus be seen that the invention herein disclosed furnishes not only a quick and simple means for determining the thoroughness of intermixing of feeds and feed concentrates, but also furnishes a means of determining and coding which of several types of concentrates and feeds have been intermixed.

What is claimed is:

1. A dry pulverulent feed composition having as an ingredient added thereto in nutrient quantity, magnetically attractable iron, substantially all of which is in the form of particles which lie in the range of 3 to 20 microns.

2. A dry pulverulent feed composition having as an ingredient added thereto in nutrient quantity, magnetically attractable iron, substantially all of which is in the form of particles no larger than 20 microns, a portion of said particles being of one configuration and a portion being of another configuration microscopically distinguishable from the said one configuration.

3. A dry pulverulent feed composition having as an ingredient added thereto in nutrient quantity, magnetically attractable iron, substantially all of which is in the form of particles no larger than 20 microns, a portion of said particles being of spherical form and a portion being of random configuration microscopically distinguishable from the spherical form.

4. A dry pulverulent feed composition having as an ingredient added thereto in nutrient quantity, magnetically attractable iron, portion of said ingredient iron being carbonyl iron and another portion thereof being ferrum reductum.

5. The process of making a physically traceable feed concentrate which consists in adding to dry pulverulent food material a given quantity of an iron nutrient in the form of magnetically attractable particles no larger than 20 microns.

6. The process of making a physically traceable feed concentrate which consists in adding to dry pulverulent fortifier material a given quantity of an iron nutrient in the form of magnetically attractable particles no larger than 20 microns, relative proportions of said particles being of spherical form and of random configuration microscopically distinguishable from each other.

7. The method of testing uniformity of blend in a quantity of dry pulverulent feed material which consists in admixing with the feed a given quantity of magnetically attractable nutrient iron, sampling randomly the resulting product and suspending in a liquid medium, agitating the suspended product in the presence of a magnet and quantitatively collecting the nutrient iron thereon, and then weighing the collected iron.

8. The method of identifying a pulverulent dry feed product to which has been added a feed concentrate containing given relative quantities of spherical and randomly configured microscopic magnetic iron particles, said method consisting in magnetically separating the iron particles from the product and microscopically segregating said particles in respect to configuration thereof and in respect to the relative proportions therebetween.

9. The method of identifying any of a plurality of fortified dry pulverulent feed products which consists in respectively blending therewith feed concentrates each containing nutrient magnetic iron having different given relative proportions of spherical and randomly configured iron particles with mean diameters lying in a range between 3 and 20 microns, and subsequently sampling a fortified dry pulverulent feed product and magnetically separating from the sample its magnetic iron particles and microscopically segregating said particles in respect to configuration thereof and in respect to the approximate ratio therebetween.

10. The method of analytically separating from a quantity of dry pulverulent feed material nutrient elemental iron admixed therein in finely divided condition and relatively small proportion, which method consists in suspending in a liquid medium, agitating the suspended material in the presence of a magnet, and quantitatively collecting the iron thereon, and then weighing the collected iron.

11. A dry pulverulent feed composition having as an ingredient added thereto in nutrient quantity magnetically attractable iron particles no larger than 20 microns, a portion of said particles being carbonyl iron and another portion thereof being ferrum reductum.

References Cited in the file of this patent
UNITED STATES PATENTS

| | | |
|---|---|---|
| 2,695,517 | Dunmire | Aug. 3, 1954 |
| 2,712,997 | Cooley | July 12, 1955 |